June 6, 1939. G. S. ANDREWS 2,160,813
CHRONOMETRIC TACHOMETER
Filed Aug. 10, 1935
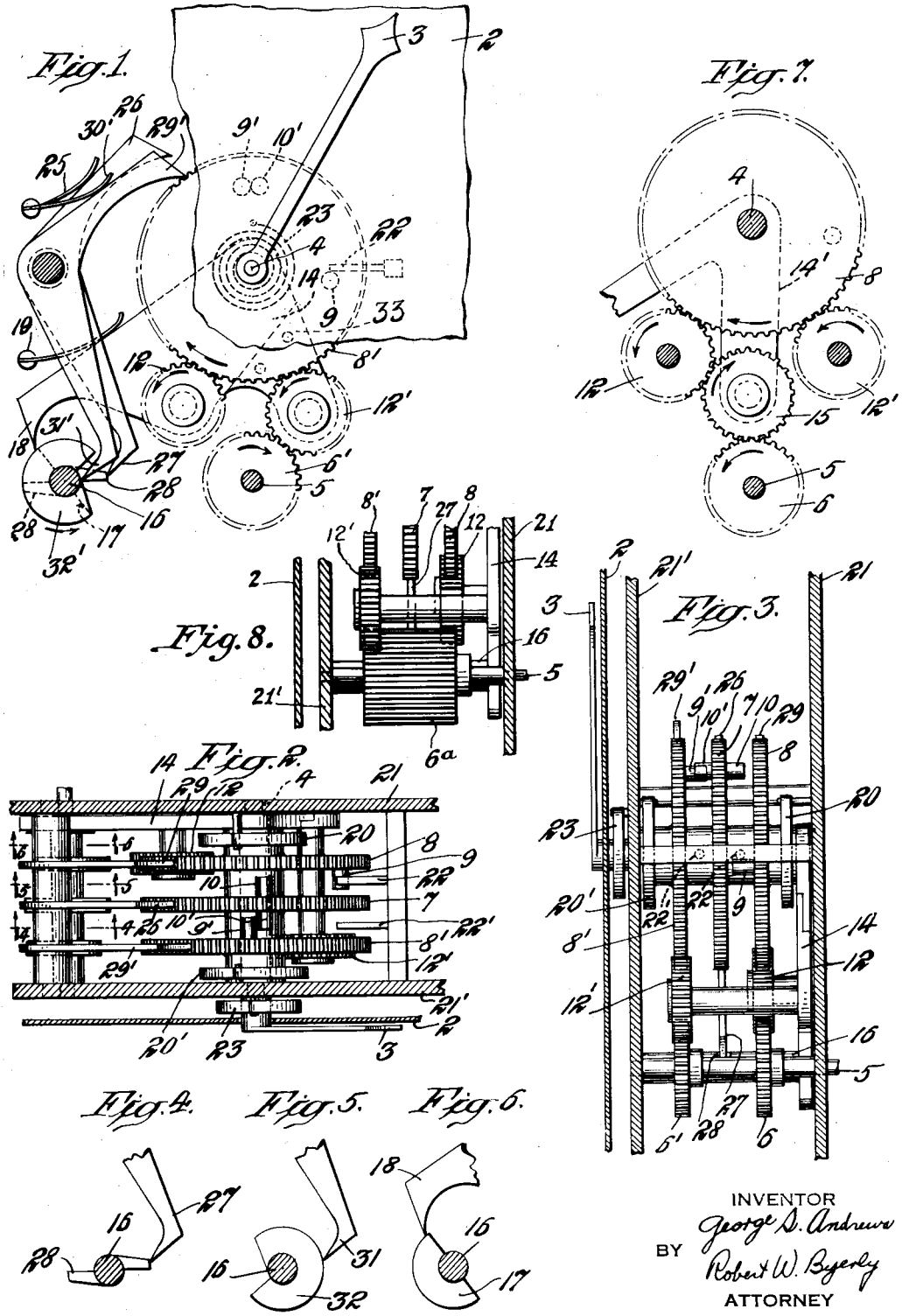
INVENTOR
George S. Andrews
BY Robert W. Byerly
ATTORNEY Patented June 6, 1939

2,160,813

UNITED STATES PATENT OFFICE 2,160,813

CHRONOMETRIC TACHOMETER

George S. Andrews, Rye, N. Y.

Application August 10, 1935, Serial No. 35,566

9 Claims. (Cl. 235—104)

This invention relates to tachometers and aims to provide an improved tachometer of the chronometric type.

The chronometric tachometers now in common use comprise a timing mechanism having an escapement and means for driving a shaft at constant speed; driving mechanism operated at variable speeds corresponding to the speeds of the apparatus to which the tachometer is attached and having a rectifying device which assures unidirectional movement of the driving mechanism; and a mechanism for integrating the variable speed element and the constant speed element to give an indication of the speed of the apparatus to which the tachometer is attached. It is to the integrating mechanism of such a tachometer that my invention relates in particular.

So far as I am aware, the only chronometric tachometers which have been used heretofore have been operated on a cycle, fixed by the timing mechanism, in the neighborhood of from one to two seconds. The periodic fluctuations of the indicator resulting from such comparatively long cycles have been found to be disconcerting to the observer, especially when the speed varies greatly. Attempts have been made to smooth out such excessive fluctuations of the indicator through the use of a so-called stabilizer disk which renders the indicator insensitive to any but comparatively large variations in speed, resulting in a loss in the accuracy with which changes in speed are indicated which is directly proportional to the effectiveness of such devices in smoothing out undesirable fluctuations of the indicator.

Furthermore, in the usual tachometers of the chronometric type actual measurement occupies only a fraction of the duration of each cycle. Hence, the indicated speed is not actually the average speed during each cycle of operation, as it purports to be, but it is the average speed during that portion of each cycle when measurement actually occurs. The errors due to such intermittent measurement are often considerable, especially when the speed varies greatly.

Previous attempts have been made to remedy this defect through the use of chronometric tachometers capable of making speed measurements which are actually continuous, but such mechanisms either are subject to excessive wear or they are so complicated that they are very difficult to service; they are also expensive and are, therefore, impractical for most uses. Moreover, the great number of parts used in these complex designs occasions considerable inertia, so that great driving force is required to operate them, and even then, being inherently sluggish in action, the cycle of operation cannot, as a practical matter, be made within a sufficiently short interval with any reasonable degree of accuracy or evenness of operation.

By my invention these disadvantages are overcome and an improved tachometer of the chronometric type is provided, in which continuous, actual measurements may be made during successive intervals of shorter duration than has been possible heretofore. This is accomplished through the use of fewer and less complex parts than have been required in previous devices for obtaining continuous measurements, thereby reducing the torque required to drive the mechanism, and the cost of producing such mechanisms.

In accordance with the invention, a tachometer of the chronometric type having a driving member is provided with a pair of counting members, means for bringing the driving member into operative connection with the counting members alternately during successive intervals of equal duration, an indicator shaft, and means for connecting said indicator shaft with the counting member which is in operative connection with said driving member.

In order that my invention may be clearly understood, I will describe, in detail, the specific embodiment of it which is illustrated diagrammatically in the accompanying drawing, in which:

Fig. 1 is a front elevation showing an integrating mechanism of a chronometric tachometer embodying my invention;

Fig. 2 is a plan view of the same;

Fig. 3 is a side elevation thereof;

Fig. 4 is a section along the lines 4—4 of Fig. 2, showing one of the cams and its follower;

Fig. 5 is a section along the lines 5—5 of Fig. 2, showing another of the cams and its follower;

Fig 6 is a section along the lines 6—6 of Fig. 2, showing another of the cams and its follower;

Fig. 7 is an elevation showing a modified form of mounting for the intermediate gears; and Fig. 8 is a side elevation showing a modified form of driving gear.

In the drawing, the numeral 2 indicates a tachometer dial around which an indicator 3, fixed to an indicator shaft 4, is swung to show the speed of rotation of a drive shaft 5. The drive shaft 5 may be connected with the usual type of driving mechanism so that it will be rotated at speeds which correspond with the speeds of the apparatus to be measured, and has fixed thereon a driving gear with which intermediate gears 12, 12' are adapted to mesh and which may consist of two like parts 6, 6' as shown in Fig. 3, one for each of the intermediate gears 12, 12', or it may comprise a single gear 6a as illustrated in Fig. 8 with which intermediate gears 12, 12' may be brought into mesh alternately.

The indicator shaft 4 is caused to rotate through an angle determined by the average speed of driving gears 6, 6' during a predetermined interval by means of an indicator gear 7, which is fixed to indicator shaft 4 between a pair of counting gears 8, 8' which are journaled on indicator shaft 4.

Fixed to indicator gear 7 is a pin having one end 10 projecting therefrom toward counting gear 8 and having its other end 10' projecting toward counting gear 8'. A pin 9 projects from counting gear 8 so that it may abut the end 10 of the pin fixed in the indicator gear 7 and a like pin 9' projects from counting gear 8' so that it may abut the end 10' of the pin fixed to indicator gear 7. When a measurement is made, counting gear 8, or counting gear 8', is operatively connected with its corresponding driving gear 6 or 6' which causes it to rotate in the direction indicated by the arrow in Fig. 1, and it is to be noted that the arrangement of pins 9, 9' with respect to the ends 10, 10' of the pin fixed in indicator gear 7 is such that the pin fixed to the counting gear which is rotated by the driving gear may strike the corresponding end of the pin projecting from indicator gear 7 so that the indicator gear, the indicator shaft to which it is fixed, and the indicator will be caused to rotate with such counting gear.

In the form of integrating mechanism which is illustrated in Figs. 1, 2 and 3, the driving gear 6 may cause counting gear 8 to rotate with it through intermediate gear 12 or driving gear 6' may cause counting gear 8' to rotate with it through intermediate gear 12'. As shown in Fig. 1, intermediate gears 12, 12' are mounted on a carrier 14 pivoted on the indicator shaft 4 so that intermediate gear 12 is always in mesh with counting gear 8, intermediate gear 12' is always in mesh with counting gear 8' and intermediate gear 12 may be placed in mesh with driving gear 6 or intermediate gear 12' may be placed in mesh with driving gear 6' by pivoting the carrier 14.

In the modification illustrated in Fig. 7, intermediate gears 12, 12' are fixed so that they are always in mesh with the respective counting gears 8, 8'. Mounted on the carrier 14' is a floating gear 15 which is constantly in mesh with driving gear 6. The carrier 14' is pivoted on the indicator shaft 4 so that the gear 15 may be brought into mesh with intermediate gear 12 or intermediate gear 12'.

In the drawing, the carrier 14 (and the carrier 14') is pivoted on indicator shaft 4. It is to be understood, however, that it is not essential that the carrier be pivoted on the indicator shaft, but it may be pivoted at any point about which it may be swung to secure alternate operative connection of driving gears 6 and 6' with intermediate gears 12 and 12', respectively.

When drive shaft 5 is rotated, the period during which counting gear 8 is operatively connected with driving gear 6, and the period during which counting gear 8' is operatively connected with driving gear 6', is of predetermined, fixed duration. A cam shaft 16, driven at a constant, predetermined speed by timing mechanism of the conventional type (not shown), has a cam 17 fixed thereto. The carrier 14 (and the carrier 14') is provided with a cam follower 18 adapted to bear against the cam 17. When the cam follower 18 bears against cam 17, the carrier is pivoted so that intermediate gear 12' is placed in mesh with driving gear 6', thereby rotating counting gear 8'. When the follower 18 is in contact with the dwell in cam 17 by virtue of rotation of the cam shaft 16, a spring 19 causes the carrier to be pivoted so that intermediate gear 12' is taken out of mesh with driving gear 6' and intermediate gear 12 is placed in mesh with driving gear 6, thereby causing counting gear 8 to rotate with driving gear 6.

After the carrier has been pivoted to release the connection between counting gear 8, or counting gear 8', with its driving gear, that counting gear is returned to its initial position. For this purpose, counting gear 8 is provided with a spring 20 attached to the frame 21 of the tachometer, and counting gear 8' is provided with a spring 20' attached to the frame 21' of the tachometer. To prevent counting gears 8, 8' from being turned back beyond their initial position, a stop 22 is provided against which the pin 9 of the counting gear 8 may rest, and a similar stop 22' is provided against which the pin 9' of counting gear 8' may rest.

When indicator gear 7 is released, it is returned to its starting position by means of a spring 23 having one end attached to indicator shaft 4 and the other end attached to the tachometer frame 21. It is prevented from going back beyond its initial position, at which point indicator 3 is at zero position on the dial, through the pin whose ends 10, 10' encounter the counting gear pins 9, 9' which rest respectively against the stops 22, 22'.

Indicator 3 and indicator gear 7 are prevented from rotating back beyond the position which they assume at the completion of a measurement by one counting gear until the second counting gear has completed its measurement.

Normally, a spring 25 presses pawl 26 resiliently against indicator gear 7 so that the indicator gear can be rotated forward, as in the case where speed is increasing, but cannot be rotated back toward its zero position. Pawl 26 is provided with a cam follower 27 adapted to bear against the cam 28 which is fixed to cam shaft 16. A pawl 29' is adapted to engage resiliently counting gear 8' against which it is pressed by spring 30', and a similar pawl 29 is adapted to engage resiliently counting gear 8 against which it is pressed by a like spring. Pawl 29 is provided with a cam follower 31 which normally bears against cam 32 fixed to cam shaft 16, and pawl 29' is provided with a cam follower 31' which normally bears against cam 32' fixed to cam shaft 16.

Cams 32 and 32' are fixed to cam shaft 16 so that, just before carrier 14 (or carrier 14') is pivoted to take intermediate gear 12 or 12' out of mesh with its driving gear 6 or 6', the corresponding cam follower 31 or 31' is in contact with the dwell in its cam and the counting gear rotated by that intermediate gear is engaged by its pawl; at the same time cam 28 engages cam follower 27 to release pawl 26 and permit indicator gear 7 to rotate backward to assume a position in which it is then held by the pin 9 or 9' fixed to that counting gear. Immediately thereafter cam follower 27 is in contact with the dwell in cam 28 and pawl 26 again engages indicator gear 7. The pawl which engages the counting gear whose measurement has been completed is then released and that counting gear is rotated back to its starting position by means of spring 20 or 20'.

As indicated in Fig. 1, the portion 33 of carrier 14 on which intermediate gear 12' is mounted is detachably secured to the carrier. Thus, when continuous measurements are not required the intermediate gear 12' may be omitted from the mechanism. If continuous measurements of greater accuracy were required, that intermediate gear 12' could be added to the tachometer.

The operation of my device is as follows:

When my tachometer is attached to an apparatus whose movement is to be measured, the movement of that apparatus causes the drive shaft 5 to be rotated through the driving mechanism and the cam shaft 16 is rotated through the timing mechanism. Assuming, for the purpose of illustration, that the indicator is at zero position on the dial and that cam follower 18 has just become engaged by cam 17, the carrier 14 will be in a position which causes intermediate gear 12' to mesh with driving gear 6'. While cam follower 18 is engaged by cam 17, the intermediate gear 12', rotated by driving gear 6', will rotate counting gear 8'. As counting gear 8' is rotated, the pin 9' bears against the end 10' of the pin fixed in indicator gear 7, and the indicator gear is thus pushed around with counting gear 8'. The angle of rotation of indicator gear 7 is thus determined by the average speed of driving gear 6' while it is in mesh with intermediate gear 12'. Since indicator gear 7 is fixed to the indicator shaft, that shaft and the indicator which is fixed to it will rotate through the same angle during that period.

When cam 17 is withdrawn from cam follower 18 through the rotation of cam shaft 16, the carrier 14 is pivoted to take intermediate gear 12' out of mesh with driving gear 6', and place intermediate gear 12 in mesh with driving gear 6. Then counting gear 8 is rotated through an angle determined by the average speed of rotation of driving gear 6 while cam follower 18 is not in engagement with cam 17. Counting gear 8' is released to return to its initial position and indicator gear 7 and the indicator 3 are held by pawl 26 in the position to which they were pushed by counting gear 8'. If the apparatus to which the tachometer is attached has been accelerating during this second period of measurement, indicator gear 7 will have been pushed, at the end of this interval, to a point beyond that to which it was pushed during the first interval. If the apparatus has been decelerating during the second interval of measurement, the release of pawl 26 permits indicator gear 7, and the indicator, to rotate back to the point to which the pin 9 attached to counting gear 8 has been rotated during that second interval of measurement.

After intermediate gear 12, or intermediate gear 12', is taken out of mesh with its driving gear, the corresponding counting gear 8, or counting gear 8', is temporarily held, by its pawl 29 or 29', in the position to which it had been rotated when its intermediate gear was taken out of mesh with the driving gear so that, if there has been deceleration, indicator gear 7 may rotate back to, but not beyond, the proper position, as determined by the pin 9, or the pin 9'.

It is to be understood that the form of my invention herewith shown and described is to be taken as a preferred example of the same, and that various changes in the shape, size and arrangement of parts may be resorted to without departing from the spirit of my invention or the scope of the subjoined claims.

What is claimed is:

1. In a chronometric tachometer, the combination, with a drive shaft, of an indicator shaft, a pair of driving gears fixed to said drive shaft, a pair of counting gears journaled on said indicator shaft on common planes with the respective driving gears, an indicator gear fixed to the indicator shaft between said counting gears, means for operatively connecting the respective driving gears with the corresponding counting gears alternately throughout successive intervals of equal duration, and means for connecting said indicator gear with the counting gear which is in operative connection with its driving gear.

2. In a chronometric tachometer, the combination, with a drive shaft, of an indicator shaft, a pair of driving gears fixed to said drive shaft, a pair of counting gears journaled on said indicator shaft on common planes with the respective driving gears, each of said counting gears having a pin projecting therefrom toward the other counting gear, means for operatively connecting the respective driving gears with the corresponding counting gears alternately throughout successive intervals of equal duration, an indicator gear fixed to said indicator shaft between the counting gears, and a pin fixed in said indicator gear so that its ends are adapted to abut the pins fixed in said counting gears and the indicator gear may be rotated with the counting gear which is in operative connection with its driving gear.

3. In a chronometric tachometer, the combination, with a driving gear, of a pair of counting gears, an intermediate gear in mesh with one of said counting gears, a second intermediate gear in mesh with the other of said counting gears, means for bringing said intermediate gears into mesh with said driving gear alternately throughout successive intervals of equal duration, an indicator shaft, and means for connecting said indicator shaft with the counting gear having its intermediate gear in mesh with said driving gear.

4. In a chronometric tachometer, the combination, with a driving gear, of an indicator shaft, a carrier mounted for pivotal movement, a pair of spaced intermediate gears mounted on said carrier, a counting gear mounted on said indicator shaft and in constant mesh with one of said intermediate gears, a second counting gear mounted on said indicator shaft and in constant mesh with the second intermediate gear, and means for pivoting said carrier to bring said intermediate gears into mesh with said driving gear alternately throughout successive intervals of equal duration.

5. In a chronometric tachometer, the combination, with a driving gear, of an indicator shaft, a pair of counting gears mounted on said indicator shaft, a carrier pivoted on said indicator shaft, an intermediate gear mounted on said carrier and in mesh with one of said counting gears, a second intermediate gear mounted on said carrier and in mesh with the second counting gear, and means for pivoting said carrier to bring said intermediate gears into mesh with said driving gear alternately throughout successive intervals of equal duration.

6. In a chronometric tachometer, the combination, with a driving gear, of an indicator shaft, a pair of counting gears mounted on said indicator shaft, a carrier pivoted on said indicator shaft, an intermediate gear mounted on said carrier and in mesh with one of said counting gears, a second intermediate gear detachably mounted on said carrier and in mesh with the second counting gear, and means for pivoting said carrier to bring said intermediate gears into mesh with said driving gear alternately throughout successive intervals of equal duration.

7. In a chronometric tachometer, the combination, with a driving gear, of an indicator shaft, a pair of counting gears mounted on said indicator shaft, a carrier pivoted on the indicator shaft, a floating gear mounted on said carrier in mesh with said driving gear, and means for pivoting said carrier to bring said floating gear into operative connection with said counting gears alternately throughout successive intervals of equal duration.

8. In a chronometric tachometer, the combination, with a drive shaft, of an indicator shaft, a pair of counting gears journaled on said indicator shaft, a member fixed to said indicator shaft between the counting gears, means for rotating the respective counting gears with said drive shaft alternately throughout successive intervals of equal duration, a releasable connection between each of said counting gears and the member fixed to the indicator shaft adapted to cause said indicator shaft to rotate with the counting gear which is rotated with said drive shaft, a spring adapted to rotate said indicator shaft in a reverse direction, and means for delaying reverse rotation of said indicator shaft when said connection is released.

9. In a chronometric tachometer, the combination, with a drive shaft, of an indicator shaft, a pair of counting gears journalled on said indicator shaft, means for rotating the respective counting gears with said drive shaft alternately throughout successive intervals of equal duration, a releasable connection adapted to cause said indicator shaft to rotate with the counting gear which is rotated with said drive shaft, a pair of springs attached to the respective counting gears and adapted to rotate said counting gears in a reverse direction, a spring adapted to rotate said indicator shaft in a reverse direction, means for delaying reverse rotation of the respective counting gears upon the release of the connection with said drive shaft, and means for preventing reverse rotation of the indicator shaft when either of said counting gears is rotated in a reverse direction.

GEORGE S. ANDREWS.